United States Patent [19]

Monforte et al.

Best Available Copy

[11] E Re. 29,476

[45] Reissued Nov. 22, 1977

[54] METHOD FOR FABRICATING A DIELECTRIC FILLED FERRITE TOROID FOR USE IN MICROWAVE DEVICES

[75] Inventors: Frank R. Monforte, Los Altos; Giltan M. Argentina, San Jose, both of Calif.

[73] Assignee: Ampex Corporation, Redwood City, Calif.

[21] Appl. No.: 785,898

[22] Filed: Apr. 8, 1977

Related U.S. Patent Documents

Reissue of:

[64] Patent No.: 4,007,541
Issued: Feb. 15, 1977
Appl. No.: 567,757
Filed: Apr. 14, 1975

[51] Int. Cl.[2] ..... H01P 11/00; H01F 41/02

[52] U.S. Cl. ..... 29/600; 29/602 R; 29/608; 333/24.1; 336/212; 336/233

[58] Field of Search ..... 29/600, 602, 607, 608, 29/603; 336/233, 212; 333/24.1

[56] References Cited

U.S. PATENT DOCUMENTS

| | | | |
|---|---|---|---|
| 2,158,613 | 5/1939 | Loughlin | 336/212 |
| 2,785,038 | 3/1957 | Ferber | 29/603 |
| 3,007,125 | 10/1961 | Furbee | 336/212 |
| 3,539,950 | 11/1970 | Friebergs | 333/24.1 |
| 3,557,266 | 1/1971 | Chiba et al. | 29/603 UX |
| 3,768,040 | 10/1973 | Mason et al. | 333/24.1 |
| 3,906,408 | 9/1975 | Siekanowicz | 333/24.1 |

OTHER PUBLICATIONS

"Fabrication Processes", *Microwave Journal*, June 1966, p. 81.

*Primary Examiner*—Carl E. Hall
*Attorney, Agent, or Firm*—George B. Almeida

[57] ABSTRACT

The process provides practical manufacture of a two-piece, dielectric filled, ferrite toroid assembly while providing optimum electromagnetic characteristics presently not consistently available by manufacturing the toroid in a pressed one-piece configuration. A pair of complementary ferrite blanks of selected shapes are machined to dimension, and the mating surfaces thereof are selectively lapped. The complementary ferrite parts are then permanently assembled about a pre-machined dielectric insert, and the composite toroid is secured together by a selected adhesive selectively disposed therein.

9 Claims, 8 Drawing Figures

METHOD FOR FABRICATING A DIELECTRIC FILLED FERRITE TOROID FOR USE IN MICROWAVE DEVICES

Matter enclosed in heavy brackets [ ] appears in the original patent but forms no part of this reissue specification; matter printed in italics indicates the additions made by reissue.

BACKGROUND OF THE INVENTION

1. Field

The invention relates to a preferred method for fabricating an improved dielectric filled ferrite toroid.

2. Prior Art

Phased array radar systems utilize, inter alia, phase shifters generally of a ferrite material, to vary the phase, direction of the radar beam, etc., without moving the antenna, to provide accordingly an electrical radar scan. The preferred phase shifter for such application employs a rectangular ferrite toroid, having a rectangular insert of dielectric material disposed therein, which is installed within the waveguide system.

The dielectric filled toroids are presently manufactured by techniques which are not readily adapted to high speed, mass production techniques. Typical of such manufacturing processes is the procedure wherein the ferrite part is pressed in the green ferrite state about a selected, removable, steel mandril. The mandril is removed and the ferrite part is then fired to dimensions. A machine dielectric insert is subsequently disposed in the slot formed by the mandril. As may be seen, the pressing technique supra generally requires two pressing steps; viz, a portion of the ferrite material is first partially pressed, the mandril is placed upon the partially pressed ferrite, additional ferrite material in the green state is added, and the composite ferrite part is then pressed in one piece to complete the two step pressing process. It is necessary to fire the ferrite to provide the required magnetic characteristics, which shrinks the ferrite material to preselected dimension, as commonly known in the art. Accordingly, the two step process requires starting with an oversize toroid of selected dimensions such that upon firing the toroid shrinks to the required final dimensions.

The two step pressing process briefly described above provides ferrite toroids of substantial imperfections, that is, provides toroids wherein the remanent magnetization is not consistently repeatable due to dimensional variations in each toroid manufactured. Accordingly, the pressing technique provides a very low yield of acceptable product of the order of less than 50 percent. This, in turn, increases the expense of the normally expensive ferrite phase shifters. In addition, the acceptable phase shifters fabricated by the pressing technique have varying remanent magnetizations and must be individually fitted to use in the radar system.

In addition, when performing the pressing technique, unequal pressures are exerted at various points of the toroidal cross-section which, when fired, generates a toroid of varying densities throughout its cross-section as a result of the non-uniform distribution of the applied force. This in turn causes warpage, twisting, or bowing of the toroid, or causes the ferrite toroid to crack and thus fail, generally at the corners of the cross-section. In ferrite toroids of any substantial length, the warpage or bowing in turn gives rise to a thinning of some portion of the wall cross-section, which results in a reduction of the remanent magnetization of the toroid. Insertion of the machined dielectric insert forms air gaps between the insert and the ferrite, and results in an unpredictable variation of the phase shifters insertion phase. Accordingly, the air gaps in prior art toroids are filled with a high dielectric constant material such as, for example, an epoxy material impregnated with selected dielectric material. This procedure produces toroids with unrepeatable remanent magnetization characteristics, and leads to catastrophic failure due to the thermal expansion mismatch between the filler and ferrite.

An alternate prior art manufacturing technique utilizes an isostatic pressing technique, wherein the ferrite material is pressed about a removable mandril utilizing a plastic bag to confine the product, and a fluid disposed about the plastic bag. Pressure imparted to the fluid conforms the ferrite to roughly the desired shape about the mandril.

Both the above pressing techniques have serious faults in that they are economically unfeasible, due largely to the fact that there is a low rate of yield. For example, in the first technique severe difficulty is encountered, as previously mentioned, in maintaining all interior dimensions to the required tolerances of the order of for example $\pm 0.001$ inches due to variable shrinkage, warpage and other uncontrollable phenomena inherent in the process. The technique also is generally relegated to manual operation, since any automatic press capable of performing the required functions is relatively sophisticated and thus expensive.

The second, isostatic, pressing technique has problems similar to those described above, while also yielding ferrite toroids which have considerable material excess in the finished product, requiring accordingly extensive machining to provide the required external dimensional tolerances.

It follows accordingly, that it would be highly desirable to fabricate the ferrite toroid in two parts, whereby the parts may be readily machined to exact dimensions and accurately assembled about a dielectric material of equally exact dimensions. However, the assembly of two ferrite parts along their lengths is obviously accompanied by the formation of undesirable longitudinal air gaps between the mating surfaces of the two parts. Such gaps in turn cause a deterioration of the electromagnetic characteristics of the toroid, i.e., a shearing in the magnetic hysteresis loop, and an associated indeterminable deterioration of the performance of the ferrite toroid in the waveguide system. Thus prior art manufacturing techniques have been limited to the various pressing techniques, and the associated low yield fabrication of relatively inaccurate, one-piece toroids about a dielectric insert.

SUMMARY OF THE INVENTION

The invention process provides means for overcoming the shortcomings of the prior art techniques while producing toroids of optimum, and repeatable, electromagnetic characteristics required for efficient operation in a waveguide system, utilizing fabrication of the toroid in two separate, complementary parts. Thus the fabrication process is simplified, provides a relatively high accuracy in toroid dimensions, while providing consistent repeatability in the remanent magnetizations of successive toroids. The process provides accordingly a relatively high yield of greater than 90 percent, thus decreasing the expense of the product while maintaining the desired operating characteristics.

To this end, instead of pressing the green ferrite with a wax binder about a mandril, the invention contemplates machining a pair of matching, pre-formed shapes or stock blanks of ferrite to the desired dimensions. The mating surfaces of the pair of shapes are lapped to a selected finish, whereupon a pre-formed dielectric of exact dimensions is positioned within the pair of shapes. The composite ferrite/dielectric toroid is then secured together as with an epoxy adhesive, which is then fired to the required temperatures to provide a permanent ferrite toroid structure. The adhesive may be replaced by a suitable clamping fixture.

DESCRIPTION OF THE PREFERRED EMBODIMENTS

Although the invention is herein specifically described with relation to a dielectric-filled, rectangular, ferrite toroid, it is to be understood that the process is equally applicable to the fabrication of configurations other than rectangular, and/or with products using materials other than dielectrics, ferrites, etc. Likewise, the process contemplates the manufacture in general of any multiple piece, complementary structures, wherein the electromagnetic characteristics are optimized, i.e., without compromising the magnetic performance of the structure.

Figure 1:
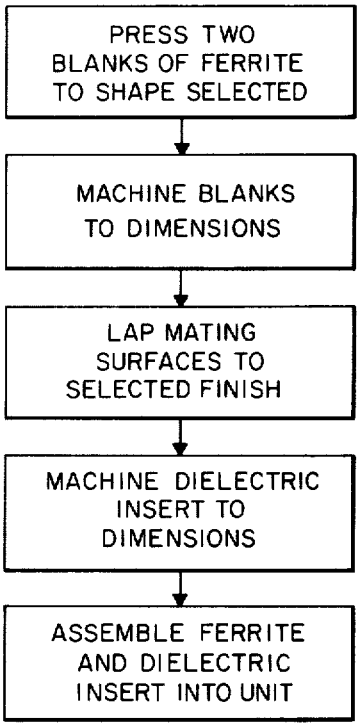
FIG. 1 is a block diagram exemplifying various steps in performing the process of the present invention.
Figure 6:
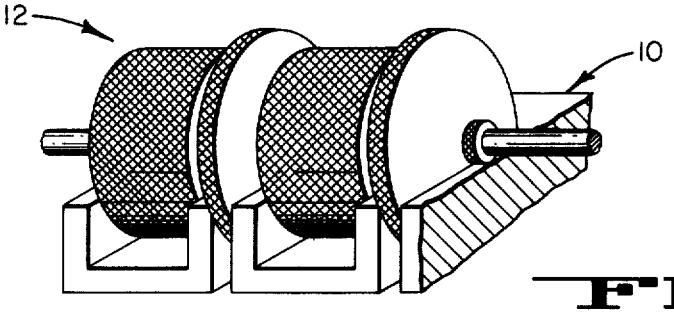
FIG. 6 is a perspective of a grinding device for forming the complementary parts of the invention toroid from a slab of ferrite material.

To this end, the invention process exemplified in FIG. 1 contemplates herein the manufacture of dielectric filled, rectangular ferrite toroids with configurations such as those of FIGS. 2–5. In a first step a ferrite material in the green state, having selected magnetic properties, and including a wax binder, is pressed with selected pressures, etc., into either pre-formed shapes such as those depicted in FIGS. 2–5 or into blank stock, or slabs of material, which are sintered at selected temperatures, then machined into the desired shapes. If pre-formed shapes are used, they are machined to exact dimensions, as in the second step. If blank stock is used a slab or sintered ferrite material 10 (FIG. 6) may be machined to required dimensions with common machining techniques utilizing a multiwheel, grinding machine 12. In either process, the shapes or parts are then cut to desired lengths to provide the complementary parts of the toroid for subsequent assembly.

Figure 2:
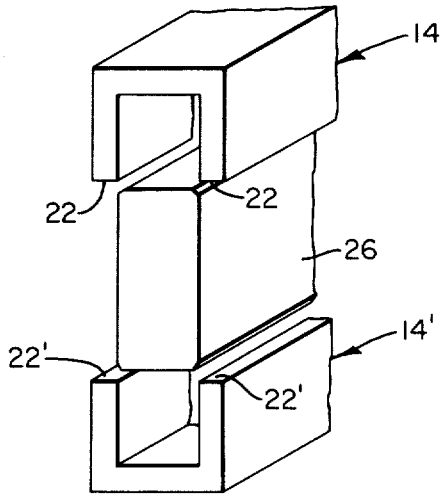
FIGS. 2–5 are perspectives of various ferrite toroid configurations which may be manufactured utilizing the process of FIG. 1.
Figure 3:
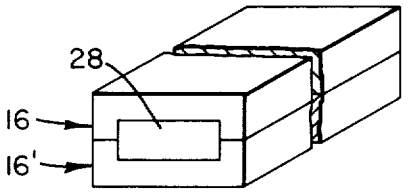
Figure 4:
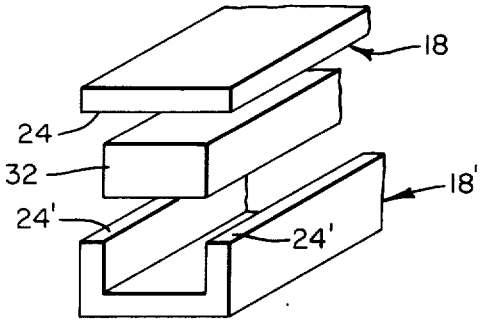
Figure 5:
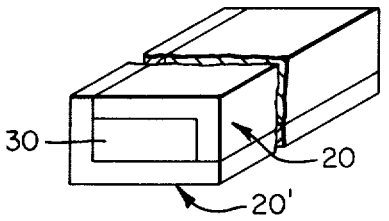

The machined ferrite parts (exemplified by numerals 14–14', 16–16', 18–18' and 20–20– of FIGS. 2–5 respectively) are then lapped along their confronting surfaces, *e.g., surfaces 22–22' and 24–24' of FIGS. 2 and 4 respectively,* to a selected surface roughness, which is dependent upon the magnetic characteristics of the ferrite material. *The selected surface roughness is determined by the hysteresis loop characteristics inherent in a similar one-piece toroid configuration of the same magnetic material. Thus it is only necessary to provide the confronting surfaces of the two-piece toroid with a finish sufficient to maintain the commensurate hysteresis loop characteristics.*

For example, the surfaces are generally lapped to a 1–10 microinch finish, wherein the finish required is that necessary to maintain the hysteresis loop characteristics of the particular ferrite material. Of the various cross-sectional configurations shown, that of FIGS. 2, 3 is preferred in that the lapping operation is performed most easily with a minimum of confronting surface area requiring lapping. However, all of the various configurations are amenable to automatic pressing and machining techniques, with various degrees of ease in performing the lapping step to within a 1–10 microinch finish.

After performing the lapping process, a dielectric material insert (depicted by numerals 26, 28, 30 and 32) is machined to required dimensions conforming to the inside dimensions of the machined ferrite parts, as depicted by the fourth step of FIG. 1. An epoxy adhesive may be disposed on the dielectric and the dielectric insert is placed within the ferrite parts, to provide an integral, composite toroid as depicted in the fifth step. As shown in FIG. 2, the corners of the dielectric insert 26 may be beveled to allow addition of the epoxy adhesive along the bevel, i.e. along the corners of the dielectric insert, whereby upon assembly the epoxy adhesive fills the void between the beveled corners and the corners of the assembled ferrite parts. Since the dimensions of the bevel, inside dimensions of the toroid parts, etc., can be readily maintained via the machining technique, the remanent magnetization of the assembled toroid and the insertion phase may be readily repeated between successive toroids manufactured via the instant process utilizing mass production techniques. If an epoxy adhesive is employed to assemble the toroids, the toroid is then heated to the corresponding curing temperature. Obviously, other types of adhesives may be employed to secure the composite toroid. If desired, the toroid may be assembled without adhesives utilizing any of various available mechanical clamping fixtures (not shown).

As may be seen, the fact that the ferrite toroid is formed of two separate parts allows machining to within critical tolerances without experiencing any density variations, warping, bowing, etc., such as experienced in the prior art pressing technique when forming the toroid in a one-piece configuration about a mandril. The lapping process then allows assembly of the two parts to provide a composite toroid wherein the hysteresis loop characteristics are maintained for optimum operation of the finished product. Furthermore, repeatability of the remanent magnetization of successive toroids is readily achieved, thereby providing a product which is readily installed in a microwave system with a minimum of manual adaptation such as tuning, testing, etc. It follows that the yield of product utilizing the instant process is relatively high compared to the prior art pressing technique, i.e., the yield is greater than 90 percent.

Figure 7:
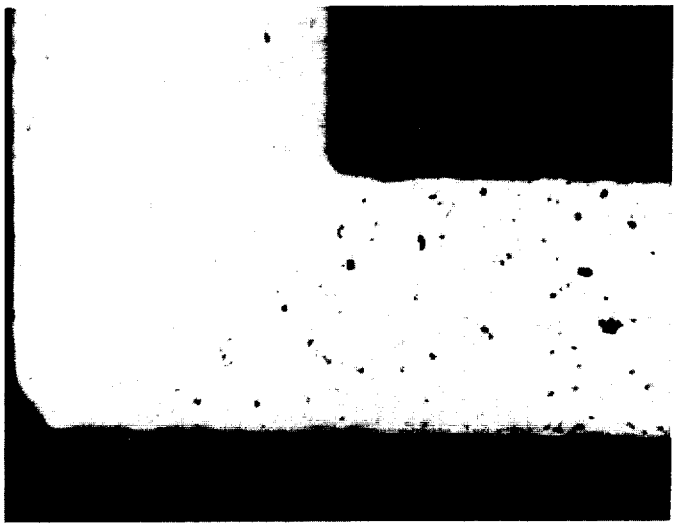
PRIOR ART FIG 7
FIGS. 7 and 8 are photomicrographs of cross-sections of a toroid formed by the prior art pressing method, and the invention two-piece method, respectively.

FIG. 7 is a photomicrograph of a toroid having cross-section dimensions of 0.34 by 0.034 inches, formed by prior art pressing methods, wherein the porosity distributions are shown. It is readily seen that the distributions are not uniform, and are related to the presence of the removable mandril employed during the two-step pressing process, and the fact that there is a non-uniform distribution of the applied pressing force.

Figure 8:
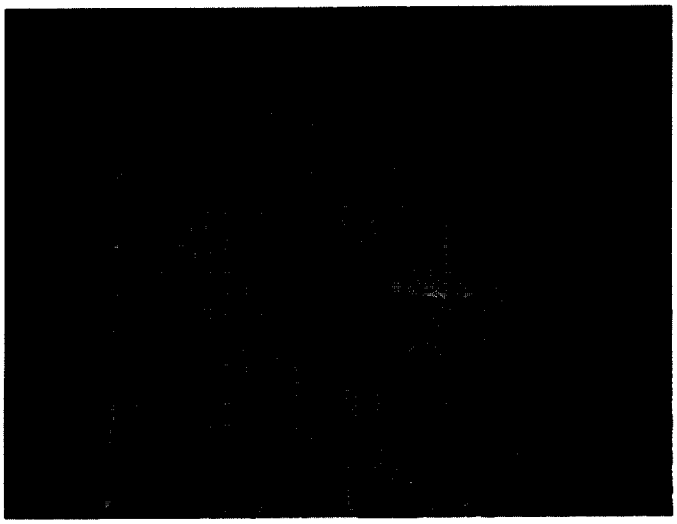

On the other hand, FIG. 8 is a photomicrograph taken of a similar toroid formed by the two-piece invention process, which shows a relatively uniform porosity, i.e., a uniformly dense, toroid cross-section.

It follows that the in-batch repeatability of the toroid remanent magnetization characteristics, provided by the invention process, is ±0.6 percent deviation. This compares to a prior art pressing process deviation of ±1.0 percent. If acceptable toroids are constrained to ±2.5 percent of a minimal value, the reject rates for the two-piece invention process are of the order of 2 percent, whereas the reject rates for the prior art process are of the order of 19 percent.

In addition, a 2.5 percent depression of remanent magnetization can be the result of warpage or bowing on the order of 0.002 inches for a 0.05 inch wall toroid. Bowing or warpage of magnitude greater than 0.005 inches readily detectable and commonly occurs in the prior art process, and toroids this defective were not included in the 19 percent reject rate mentioned above. It is estimated that the reject rate for warpage and bowing generated by the prior art process, in excess of 0.005 inch for 5 inch length toroids are:

| Wall Thickness (inch) | Reject Rate (percent) |
|---|---|
| 0.05 | 50 |
| 0.07 | 40 |
| 0.10 | 30 |

The above rates are for the prior art process. The invention two-piece process is not affected by bowing or warpage since the machining process employed does not generate such conditions. Therefore, the invention reject rate is not concerned with warpage or bowing problems.

As previously mentioned, the required lapping finish varies with the properties of the magnetic material employed to fabricate the finished toroid. Thus a ferrite material of lower magnetic flux density can tolerate a larger gap, i.e., can tolerate a rougher surface finish of 10 microinches, whereas a material of higher magnetic flux density requires a surface finish of, for example, 1–5 microinches.

We claim:

1. A method for fabricating a two-piece toroid having a dielectric material insert, which two-piece toroid exhibits the hystersis loop characteristics of a one-piece toroid, comprising the steps of:

pressing selected quantities of a magnetic material into a pair of selected complementary blanks of substantially uniform density over their entire cross-sections;

machining the pair of blanks to define confronting mating surfaces commensurate with complementary cross-sectional shapes and lengths of given dimensions within selected tolerances;

lapping the confronting mating surfaces of the pair of machined shapes to a finish sufficient to maintain the hystersis loop characteristics inherent in a similar one-piece configuration formed of the same magnetic material;

machining a single dielectric material insert to outside dimensions which allow the insert to fit snugly within the complementary pair of magnetic machined shapes along the entire length thereof; and assembling the complementary pair of machined shapes about the dielectric material insert with intimate contact between all surfaces of the insert facing respective confronting surfaces of the machined shapes, wherein the lapped confronting surfaces of the machined shapes are in such intimate contact that the hysteresis loop characteristics are similar to those of a one-piece toroid.

2. The method of claim 1 wherein the step of lapping provides surface finishes of from 1 to 10 microinches as required to maintain the hysteresis loop characteristics of a one-piece toroid of the same material.

3. The method of claim 2 wherein the step of pressing includes, pressing each of the complementary blanks to define rough forms of the given complementary cross-sectional shapes.

4. The method of claim 2 wherein the step of pressing includes, pressing the complementary blanks in the form of rough slabs of the magnetic material; and the step of machining the pair of blanks includes, grinding the slabs into the cross-sectional shapes of given dimensions.

5. The method of claim 2 wherein the magnetic material is a ferrite material.

6. The method of claim 5 further including the step of disposing selected adhesive on selected portions of the composite toroid to permanently secure the complementary pair of magnetic machined shapes in intimate contact at all surfaces thereof confronting the confined dielectric material insert.

7. The method of claim 6 further including the step of beveling the dielectric material along the corners thereof to allow disposition therealong of the selected adhesive.

*8. A method for fabricating a two-piece toroid having a dielectric material insert, which two-piece toroid exhibits the hysteresis loop characteristics of a one-piece toroid, comprising the steps of;*

*machining a pair of complementary blanks of a magnetic material, with a substantially uniform density over the blanks' cross-sections, to define confronting mating surfaces on the blanks commensurate with the complementary cross-sectional shapes and lengths of given dimensions within selected tolerances;*

*lapping the confronting mating surfaces of the pair of machined shapes to a finish sufficient to maintain the hysteresis loop characteristics inherent in a similar one-piece configuration formed of the same magnetic material;*

*machining a dielectric material to form a single insert of outside dimensions which allow the insert to fit snugly within the complementary pair of magnetic machined shapes along the entire length thereof; and*

*assembling the complementary pair of machined shapes about the dielectric material insert with intimate contact between all surfaces of the insert facing respective confronting surfaces of the machined shapes, wherein the lapped confronting surfaces of the machined shapes are in such intimate contact that the hysteresis loop characteristics are similar to those of a one-piece toroid.*

*9. The method of claim 8 wherein the step of lapping provides surface finishes of the order of 1 to 10 microinches commensurate with maintaining the hysteresis loop characteristics of a one-piece toroid of the same material.*

* * * * *